US009426783B2

(12) United States Patent
Gleixner

(10) Patent No.: US 9,426,783 B2
(45) Date of Patent: Aug. 23, 2016

(54) METHODS, APPARATUSES, AND SYSTEMS FOR RESOURCE ALLOCATION FOR TERMINALS

(71) Applicant: Industrial Technology Research Institute, Chutung (TW)

(72) Inventor: Stephan Gleixner, Zhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 80 days.

(21) Appl. No.: 14/042,928

(22) Filed: Oct. 1, 2013

(65) Prior Publication Data
US 2014/0126492 A1    May 8, 2014

Related U.S. Application Data

(60) Provisional application No. 61/721,902, filed on Nov. 2, 2012.

(51) Int. Cl.
*H04W 4/00* (2009.01)
*H04W 72/04* (2009.01)
(Continued)

(52) U.S. Cl.
CPC .............. *H04W 72/04* (2013.01); *H04W 4/005* (2013.01); *H04W 72/00* (2013.01); *H04W 76/00* (2013.01); *H04W 88/08* (2013.01)

(58) Field of Classification Search
USPC ......................................... 370/329, 433, 437
See application file for complete search history.

(56) References Cited

U.S. PATENT DOCUMENTS 8,125,892 B1    2/2012 Jokimies et al.
8,160,014 B2    4/2012 Ojala et al.
(Continued)

FOREIGN PATENT DOCUMENTS

WO    WO-2008/151407 A1    12/2008
WO    WO-2009/117210 A2    9/2009

OTHER PUBLICATIONS

Duan, X., et al.; "An Improved Approach of Sending BSR and SR Based on MAC Layer in LTE System;" IEEE International Conference Business Computing and Blob Information; pp. 520-523; dated Jul. 2011; abstract retrieved on Nov. 15, 2013 from <http://ieeexplore.ieee.org/xpl/freeabs_all.jsp?arnumber=6003964&abstractAccess=no&userType=inst>.
(Continued)

*Primary Examiner* — Phuongchau Ba Nguyen
(74) *Attorney, Agent, or Firm* — Alston & Bird LLP

(57) ABSTRACT

Embodiments of the present disclosure are directed to methods and systems for resource allocation for terminals. In this regard, a method is provided that at least includes determining, by a terminal, a data stream is to be transported over a radio bearer in an aggregated data stream; determining if the data stream is a first data stream to be transported over the radio bearer; in the instance where the data stream is the first data stream, sending a signaling message at least comprising a periodicity of the first data stream and a packet size to a network node; in the instance where the data stream is an additional data stream to be transported over the radio bearer, sending the signaling message at least comprising a periodicity of the additional data stream, an offset from the first data stream, and a packet size to the network node; receiving a persistent/semi-persistent scheduled grant for data message from the network node if the network node determines that persistent/semi-persistent scheduling is beneficial, otherwise the network node may choose dynamic scheduling; and sending the aggregated data stream to the network node. Corresponding apparatuses and systems are also provided.

16 Claims, 14 Drawing Sheets

(51) Int. Cl.
    *H04W 72/00* (2009.01)
    *H04W 88/08* (2009.01)
    *H04W 76/00* (2009.01)

(56) References Cited

U.S. PATENT DOCUMENTS

| | | | |
|---|---|---|---|
| 2008/0232284 A1 | 9/2008 | Dalsgaard et al. | |
| 2008/0232314 A1* | 9/2008 | Schneider | H04W 72/1289 370/329 |
| 2009/0003282 A1 | 1/2009 | Meylan et al. | |
| 2009/0073958 A1 | 3/2009 | Xu | |
| 2009/0257385 A1 | 10/2009 | Meylan et al. | |
| 2010/0054145 A1* | 3/2010 | Frenger | H04W 72/085 370/252 |
| 2010/0238875 A1* | 9/2010 | Sung | H04L 12/66 370/329 |
| 2011/0032935 A1* | 2/2011 | Yang | H04L 47/10 370/389 |
| 2011/0039568 A1 | 2/2011 | Zhang et al. | |
| 2011/0274040 A1 | 11/2011 | Pani et al. | |
| 2011/0310777 A1 | 12/2011 | Jiang et al. | |
| 2012/0039263 A1* | 2/2012 | Moberg | H04W 72/1284 370/329 |
| 2012/0069805 A1* | 3/2012 | Feuersanger | H04W 72/1284 370/329 |
| 2012/0281566 A1 | 11/2012 | Pelletier et al. | |
| 2013/0083753 A1 | 4/2013 | Lee et al. | |
| 2013/0088983 A1* | 4/2013 | Pragada | H04W 16/14 370/329 |
| 2013/0100936 A1* | 4/2013 | Pettersson | H04W 72/14 370/336 |
| 2014/0126492 A1* | 5/2014 | Gleixner | H04W 72/04 370/329 |

OTHER PUBLICATIONS

Fan, Y., et al.; "*Efficient Semi-Persistent Scheduling for VoIP on EUTRA Downlink;*"IEEE 68th Vehicular Technology Conference; pp. 1-5; dated Sep. 2008; abstract retrieved on Nov. 15, 2013 from <http://ieeexplore.ieee.org/xpl/freebs_all.jsp?arnumber=4657226&abstracttAccess=no&userType=inst>.

Hu, J., et al.; "*On the Efficiency of Persistent Scheduling for Non-periodic Real-time Services in IEEE 802.16e System;*" IEEE 21st International Symposium on Personal Indoor and Mobile Radio Communications; pp. 1481-1486; dated Sep. 2010; abstract retrieved on Nov. 15, 2013 from <http://ieeexplore.ieee.org/Xplore/defdeny.jsp?url=http%3A%2F%2Fieeexplore.ieee.org%2Fstamp%2Fstamp.jsp%3Ftp%3D%26arnumber%3D5671974%26userType%3Dinst&denyReason=-133&arnumber=5671974&productsMatched=null&userType=inst>.

Jiang, D., et al.; "*Principle and Performance of Semi-persistent Scheduling for VoIP in LTE System;*" IEEE International Conference on Wireless Communications; pp. 2861-1864; dated Sep. 2007; abstract retrieved on Nov. 15, 2013 from <http://ieeexplore.ieee.org/xpl/freeabs_all.jsp?arnumber=4340485&abstractAccess=no&userType=inst>.

Polignano, M., et al.; "*Power Savings and QoS Impact for VoIP Application with DRX / DTX Feature in LTE;*" IEEE 73rd Vehicular Technology Conference; pp. 1-5; dated May 2011; abstract retrieved on Nov. 15, 2013 from <http://ieeexplore.ieee.org/xpl/freeabs_all.jsp?arnumber=5956309&abstractAccess=no&userType=inst>.

Puttonen, J., et al.; "*Persistent Packet Scheduling Performance for Voice-over-IP in Evolved UTRAN Downlink;*" IEEE 19th International Symposium on Personal, Indoor and Mobile Radio Communications; pp. 1-6; dated Sep. 2008; abstract retrieved on Nov. 15, 2013 from < http://ieeexplore.ieee.org/xpl/freeabs_all.jsp?arnumber=4699600&abstractAccess=no&userType=inst>.

Zhu, J., et al.; "*Complementary Resource Allocation for Variable-Size VoIP Packet in E-UTRA;*" IEEE Wireless Communications and Networking Conference; pp. 1-5; dated Apr. 2009; abstract retrieved on Nov. 15, 2013 from < http://ieeexplore.ieee.org/Xplore/defdeny.jsp?url=http%3A%2F%2Fieeexplore.ieee.org%2Fstamp%2Fstamp.jsp%3Ftp%3D%26arnumber%3D4917635&denyReason=-133&arnumber=4917635&productsMatched=null&userType=inst>.

Li, Honggang, et al.; "*Long Cycle persistent Scheduling for Periodic M2M Transmissions;*" IEEE 802.16 Broadband Wireless Access Working Group http://ieee802.org/16; dated Sep. 10, 2011; 5 pages.

Kim, Jeongki, et al.; "*De-Allocation Method of Long Cycle Persistent Allocation;*" IEEE 802.16 Broadband Wireless Access Working Group http://ieee802.org/16; dated Nov. 9, 2011; 5 pages.

* cited by examiner

METHODS, APPARATUSES, AND SYSTEMS FOR RESOURCE ALLOCATION FOR TERMINALS

RELATED APPLICATIONS

This application claims the benefit of U.S. Provisional Application No. 61/721,902, filed Nov. 2, 2012, which is hereby incorporated by reference herein in its entirety.

TECHNICAL FIELD

Embodiments of the present disclosure generally relate to methods and systems for resource allocation for terminals, and more particularly, resource allocation for terminals with simultaneous service data flows with small IP packets and periodic properties.

BACKGROUND

Machine type communication (MTC) uses devices that capture certain events such as temperature, and gas or water consumption, and the like, and then send data over a wired or wireless network to an MTC application. Smart meters with metering application are expected to be one among the early MTC devices deployed. Many other MTC devices such as e-health monitors are envisioned and are expected to be widely used in the near future.

The 3GPP communication standards established common and specific service requirements including MTC communication scenarios. According to those standards, MTC devices may communicate directly with one or more MTC servers. In another communication scenario, so called local-access devices without 3GPP communication capability may be located in a MTC capillary network which provides local connectivity between the local-access devices within its coverage and a MTC gateway device. The MTC gateway device is a MTC device which acts as a gateway for local-access devices in a MTC capillary network to communicate through a public land mobile network (PLMN) with one or more MTC servers.

With regard to user equipment (UE) terminals running multiple "always-on" applications, the always-on applications must regularly send keep-alive packets to the application server to maintain the state of such persistent connections.

In general, radio resource scheduling refers to the process of dividing and allocating resources to specific UEs within a cell for the transmission and reception of data. The scheduling decisions cover not only the resource block assignments but also which modulation and channel-coding schemes to use (e.g., link adaptation). In essence, link adaptation adapts the selection of modulation and channel-coding schemes to current channel conditions. This in turn determines the data rate or error probability of each link.

A Medium Access Control (MAC) scheduler in an eNodeB (eNB) is in charge of assigning both uplink and downlink radio resources. The downlink scheduling information is transmitted in the Physical Downlink Control Channel (PDCCH). Uplink scheduling grants are indicated to the UE by transmitting all relevant uplink scheduling information within the PDCCH.

Allocation could be changed dynamically once per subframe, that is once per millisecond (e.g., dynamic scheduling). Each allocation could be scheduled by L1/L2 control signaling and consumes signaling resources from PDCCH.

For services with small data payloads and regular packet arrivals, the control signaling required for dynamic scheduling might be disproportionally large relative to the amount of user data transmitted. To reduce the amount of L1/L2 control signaling or even get rid of it completely, LTE also supports persistent scheduling (in addition to dynamic scheduling). Persistent scheduling implies that radio resources as well as a fixed modulation and channel-coding scheme are allocated to a user for a given set of subframes and uplink resources are allocated without a designated PDCCH uplink grant. With persistent scheduling it is difficult to allocate or reserve suitable number of resources for every user and resource mismatch is unavoidable. This is due to predicting the number of required retransmissions and in turn to allocate the required resources for retransmissions. Also, packets larger than the predefined persistent resource occur occasionally. To cope with this issue semi-persistent scheduling was introduced. The principle of semi-persistent scheduling includes two parts: persistent scheduling for initial transmissions and dynamic scheduling for retransmissions. Semi-persistent scheduling may enable the above mentioned issues with persistent scheduling to be mitigated.

Current persistent/semi-persistent scheduling mechanisms are not designed for local-access devices located in a MTC capillary network which communicate simultaneously through a MTC gateway device with one or more MTC servers or UE terminals running multiple applications.

BRIEF SUMMARY

Embodiments of the present disclosure relate to methods and systems for resource allocation for terminals. Such embodiments may relate to Machine-Type Communication (MTC), MTC gateway devices, user equipment (UE) terminals running multiple applications, and radio resource scheduling.

Methods, apparatuses and systems are therefore provided according to example embodiments of the present disclosure to provide for resource allocation for terminals.

In one embodiment, a method is provided that at least includes determining, by a terminal, a data stream with small IP packets and with periodic properties is to be transported over a radio bearer in an aggregated data stream; determining if the data stream is a first data stream to be transported over the radio bearer; in the instance where the data stream is the first data stream, sending a signaling message at least comprising a periodicity of the first data stream and a packet size to a network node; in the instance where the data stream is an additional data stream to be transported over the radio bearer, sending the signaling message at least comprising a periodicity of the additional data stream, an offset from the first data stream, and a packet size to the network node; receiving a persistent/semi-persistent scheduled grant for data message from the network node if the network node determines that persistent/semi-persistent scheduling is beneficial, otherwise the network node may choose dynamic scheduling; and sending the aggregated data stream to the network node. The messages being exchanged between the terminal and the network node may be part of L1/L2 control signaling for example.

In some embodiments, the method may further comprise determining, by the terminal, one of one or more data streams is to be suspended and sending a signaling message at least comprising a periodicity of the data stream to be suspended, an offset from the first data stream, and a packet size to the network node, wherein the packet size is set to zero.

In some embodiments, the terminal may be a machine type communication gateway device. In some embodiments, the data stream is transmitted to the machine type communication gateway device from a local-access machine type communication device.

In another embodiment, a method is provided that at least includes receiving data from a terminal comprising one of a periodicity of a first data stream or a periodicity of an additional data stream and an offset from the first data stream; determining if a persistent/semi-persistent scheduling control table exists for the data stream; in the instance where the persistent/semi-persistent scheduling control table does not already exist, creating the persistent/semi-persistent scheduling control table based at least on the data from the terminal; in the instance where the persistent/semi-persistent scheduling control table already exists, modifying the persistent/semi-persistent scheduling control table based at least on the data from the terminal; determining scheduling based at least in part upon the persistent/semi-persistent scheduling control table; and sending a persistent/semi-persistent grant for data message to the terminal if it is determined that persistent/semi-persistent scheduling is beneficial, otherwise choosing dynamic scheduling.

In another embodiment, a method is provided that at least includes receiving, by a terminal, data from one or more local-access devices; determining a fixed periodicity and a specific packet size for sending the data in an aggregated data stream to a network node; sending a signaling message at least comprising the fixed periodicity of the aggregated data stream and the specific packet size to the network node; receiving a persistent/semi-persistent grant for data message from the network node if the network node determines that persistent/semi-persistent scheduling is beneficial, otherwise the network node may choose dynamic scheduling; and sending the aggregated data stream with the fixed periodicity and the specific packet size to the network node if the network node has chosen persistent/semi-persistent scheduling.

In another embodiment, a method is provided that at least includes identifying data streams from one or more applications running on a device; determining a fixed periodicity for sending the data comprising the data streams from the one or more applications as a single data stream; sending a signaling message at least comprising the fixed periodicity of the single data stream and a packet size to a network node; receiving a persistent/semi-persistent grant for data message from the network node if the network node determines that persistent/semi-persistent scheduling is beneficial, otherwise the network node may choose dynamic scheduling; and sending the single data stream with the fixed periodicity and the packet size to the network node if the network node has chosen persistent/semi-persistent scheduling.

In another embodiment, an apparatus is provided comprising at least one processor, and at least one memory including computer program instructions, the memory and computer program instructions being configured to, in cooperation with the processor, cause the apparatus to at least determine a data stream is to be transported over a radio bearer in an aggregated data stream; determine if the data stream is a first data stream to be transported over the radio bearer; in the instance where the data stream is the first data stream, send a signaling message at least comprising a periodicity of the first data stream and a packet size to a network node; in the instance where the data stream is an additional data stream to be transported over the radio bearer, send the signaling message at least comprising a periodicity of the additional data stream, an offset from the first data stream, and a packet size to the network node; receive a persistent/semi-persistent scheduled grant for data message from the network node if the network node determines that persistent/semi-persistent scheduling is beneficial, otherwise the network node may choose dynamic scheduling; and send the aggregated data stream to the network node.

In another embodiment, an apparatus is provided comprising at least one processor, and at least one memory including computer program instructions, the memory and computer program instructions being configured to, in cooperation with the processor, cause the apparatus to at least receive data from a terminal comprising one of a periodicity of a first data stream or a periodicity of an additional data stream and an offset from a first data stream; determine if a persistent/semi-persistent scheduling control table exists for the data stream; in the instance where the persistent/semi-persistent scheduling control table does not already exist, create the persistent/semi-persistent scheduling control table based at least on the data from the terminal; in the instance where the persistent/semi-persistent scheduling control table already exists, modify the persistent/semi-persistent scheduling control table based at least on the data from the terminal; determine scheduling based at least in part upon the persistent/semi-persistent scheduling control table; and send a persistent/semi-persistent grant for data message to the terminal if the apparatus determines that persistent/semi-persistent scheduling is beneficial, otherwise the apparatus may choose dynamic scheduling.

In another embodiment, an apparatus is provided comprising at least one processor, and at least one memory including computer program instructions, the memory and computer program instructions being configured to, in cooperation with the processor, cause the apparatus to at least receive data from one or more local-access devices; determine a fixed periodicity and a specific packet size for sending the data in an aggregated data stream to a network node; send a signaling message at least comprising the fixed periodicity of the aggregated data stream and the specific packet size to the network node; receive a persistent/semi-persistent grant for data message from the network node if the network node determines that persistent/semi-persistent scheduling is beneficial, otherwise the network node may choose dynamic scheduling; and send the aggregated data stream with the fixed periodicity and the specific packet size to the network node if the network node has chosen persistent/semi-persistent scheduling.

In another embodiment, an apparatus is provided comprising at least one processor, and at least one memory including computer program instructions, the memory and computer program instructions being configured to, in cooperation with the processor, cause the apparatus to at least identify data streams from one or more applications running on a device; determine a fixed periodicity for sending the data comprising the data streams from the one or more applications as a single data stream; send a signaling message at least comprising the fixed periodicity of the single data stream and a packet size to a network node; receive a persistent/semi-persistent grant for data message from the network node if the network node determines that persistent/semi-persistent scheduling is beneficial, otherwise the network node may choose dynamic scheduling; and send the single data stream with the fixed periodicity and the packet size to the network node if the network node has chosen persistent/semi-persistent scheduling.

In another embodiment, a system is provided comprising a terminal, wherein the terminal comprises at least one processor, and at least one memory including computer program instructions, the memory and computer program instructions being configured to, in cooperation with the processor, cause the terminal to at least determine a data stream is to be transported over a radio bearer in an aggregated data stream; determine if the data stream is a first data stream to be transported over the radio bearer; in the instance where the data stream is the first data stream, send a signaling message at least comprising a periodicity of the first data stream and a packet size to the network node; in the instance where the data stream is an additional data stream to be transported over the radio bearer, send the signaling message at least comprising a periodicity of the additional data stream, an offset from the first data stream, and a packet size to the network node; receive a persistent/semi-persistent scheduled grant for data message from the network node if the network node determines that persistent/semi-persistent scheduling is beneficial, otherwise the network node may choose dynamic scheduling; and send the aggregated data stream to the network node. The system further comprises a network node, wherein the network node comprises at least one processor, and at least one memory including computer program instructions, the memory and computer program instructions being configured to, in cooperation with the processor, cause the network node to at least receive data from the terminal comprising one of a periodicity of a first data stream or a periodicity of an additional data stream and an offset from the first data stream; determine if a persistent/semi-persistent scheduling control table exists for the data stream; in the instance where the persistent/semi-persistent scheduling control table does not already exist, create the persistent/semi-persistent scheduling control table based at least on the data from the terminal; in the instance where the persistent/semi-persistent scheduling control table already exists, modify the persistent/semi-persistent scheduling control table based at least on the data from the terminal; determine scheduling based at least in part upon the persistent/semi-persistent scheduling control table; and send a persistent/semi-persistent grant for data message to the terminal if the network node determines that persistent/semi-persistent scheduling is beneficial, otherwise the network node may choose dynamic scheduling.

Additional features and advantages of the present disclosure will be set forth in part in the description which follows, and in part will be obvious from the description, or may be learned by practice of the disclosure. The features and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE SEVERAL VIEWS OF THE DRAWINGS

Figure 1:
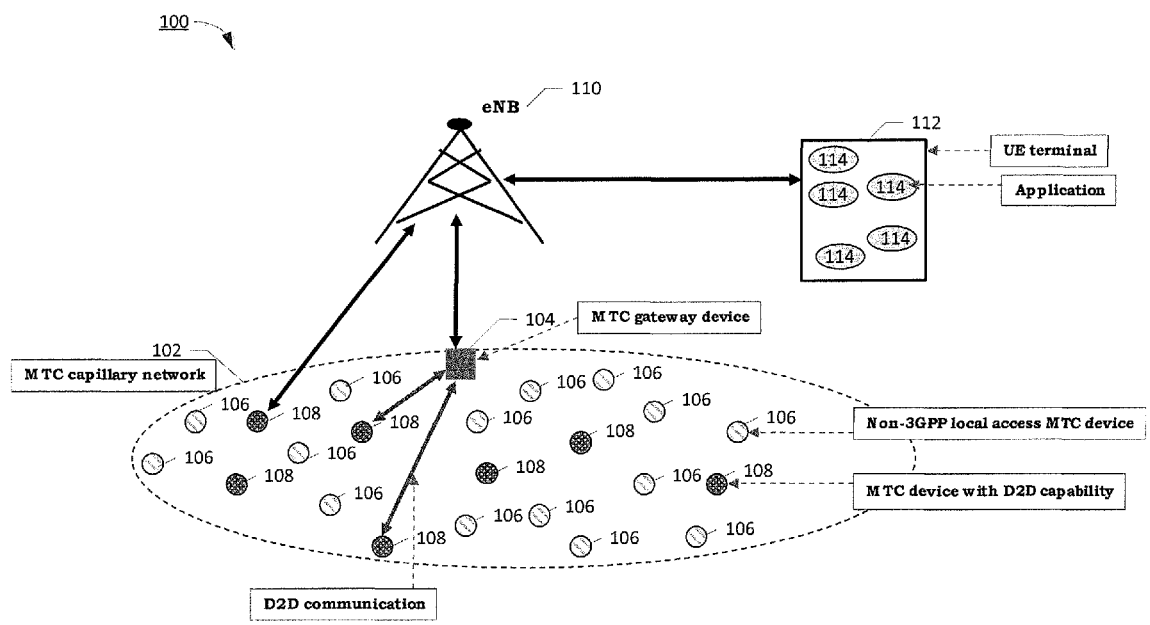
Figure 2:
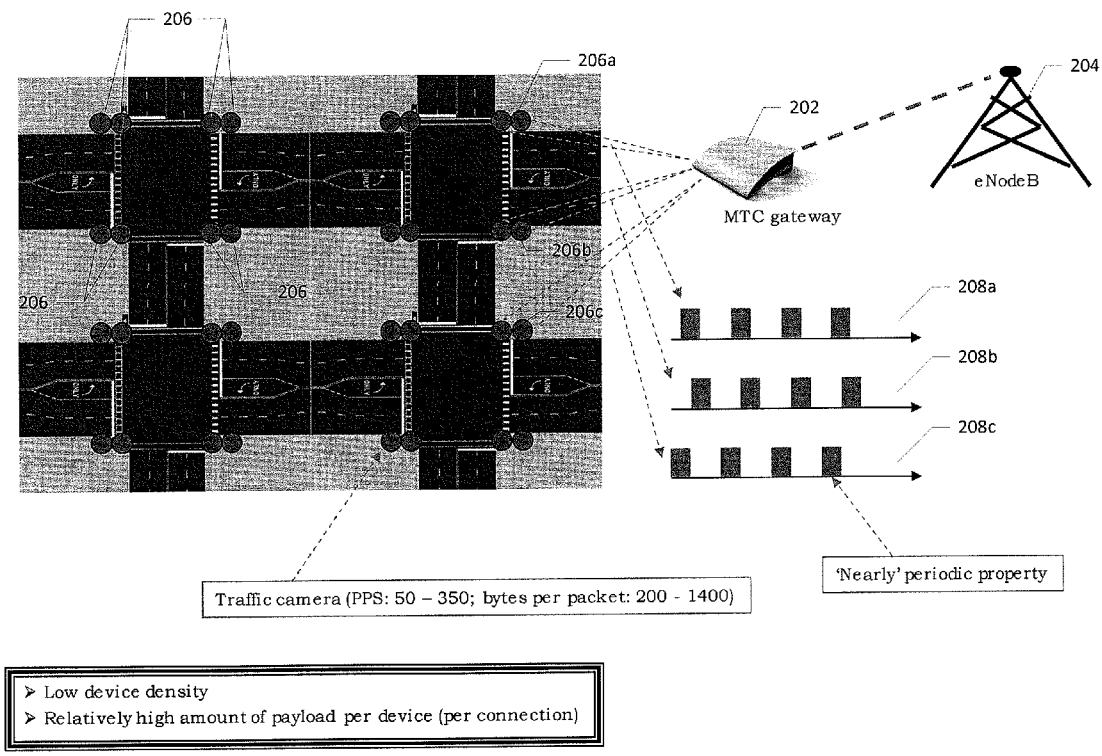
Figure 3:
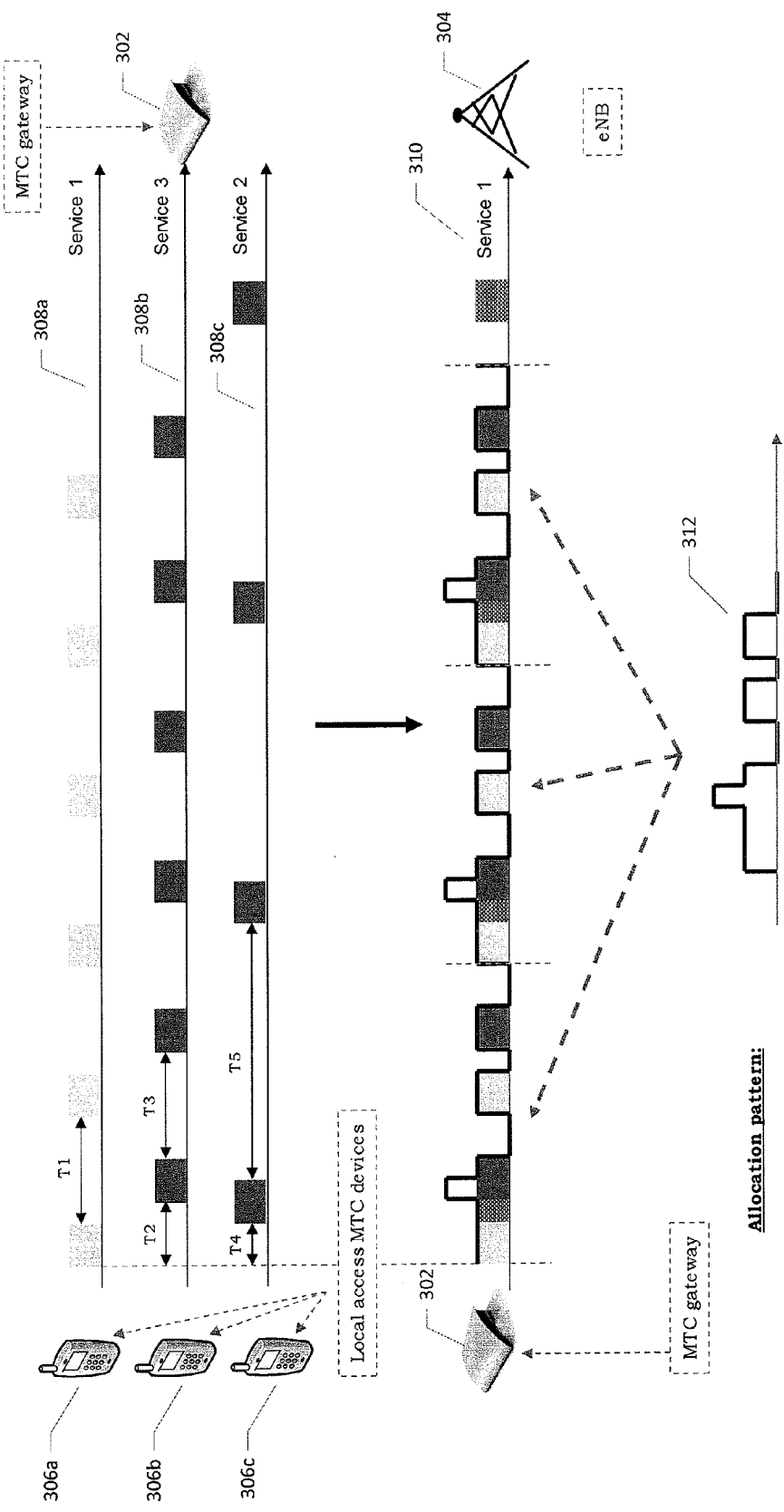
Figure 4:
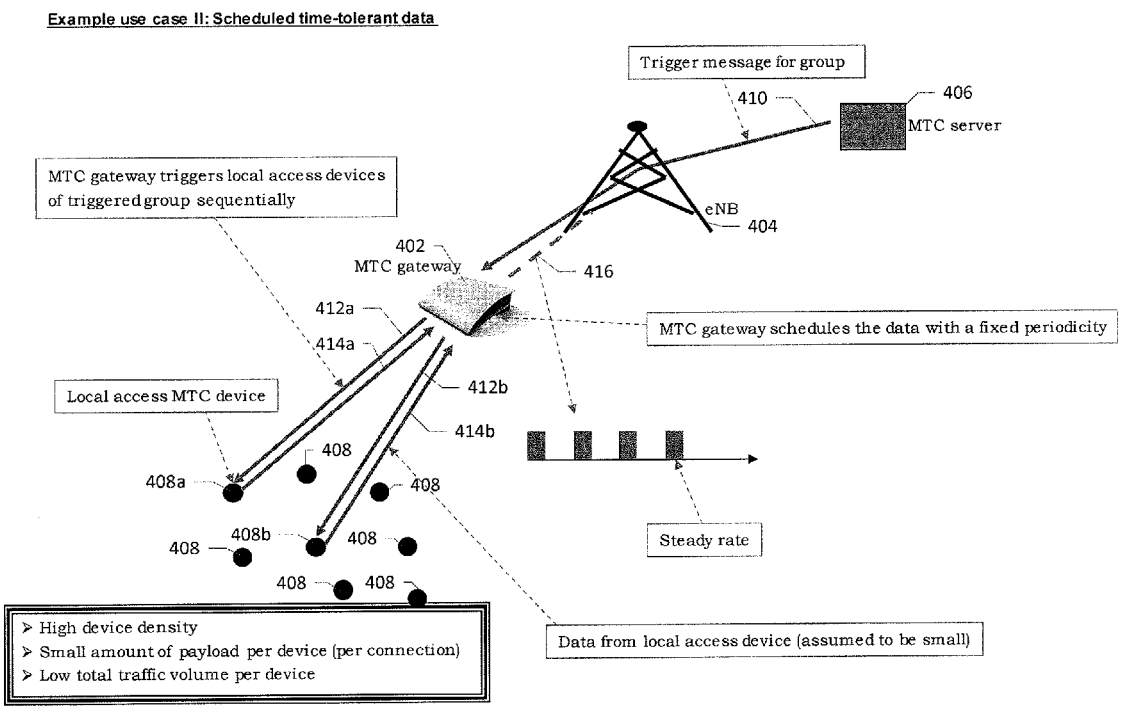
Figure 5:
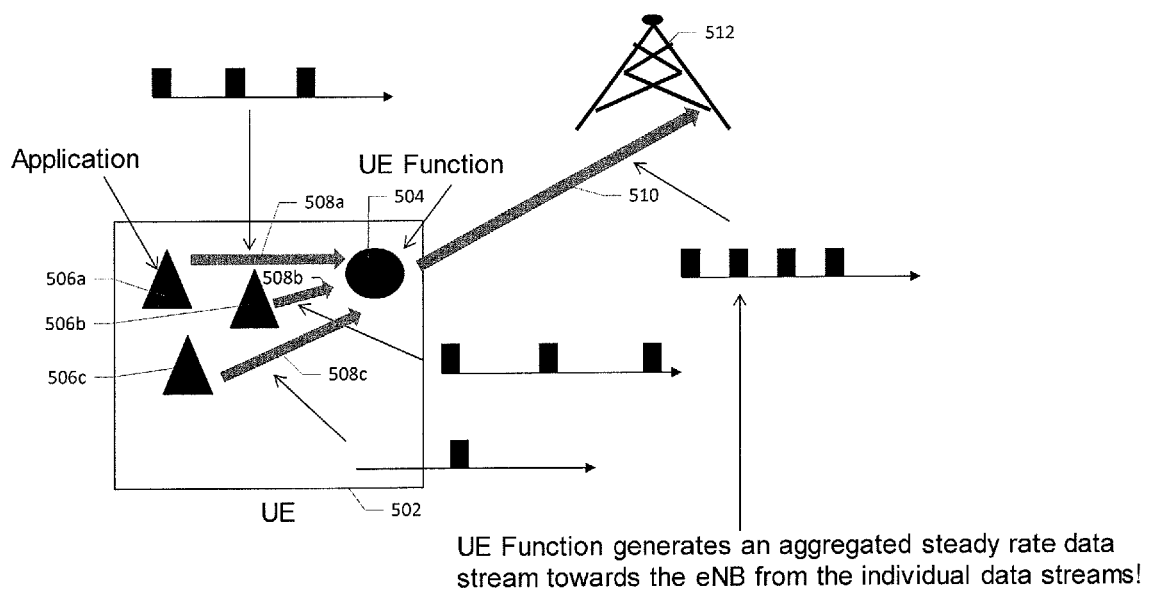
Figure 6:
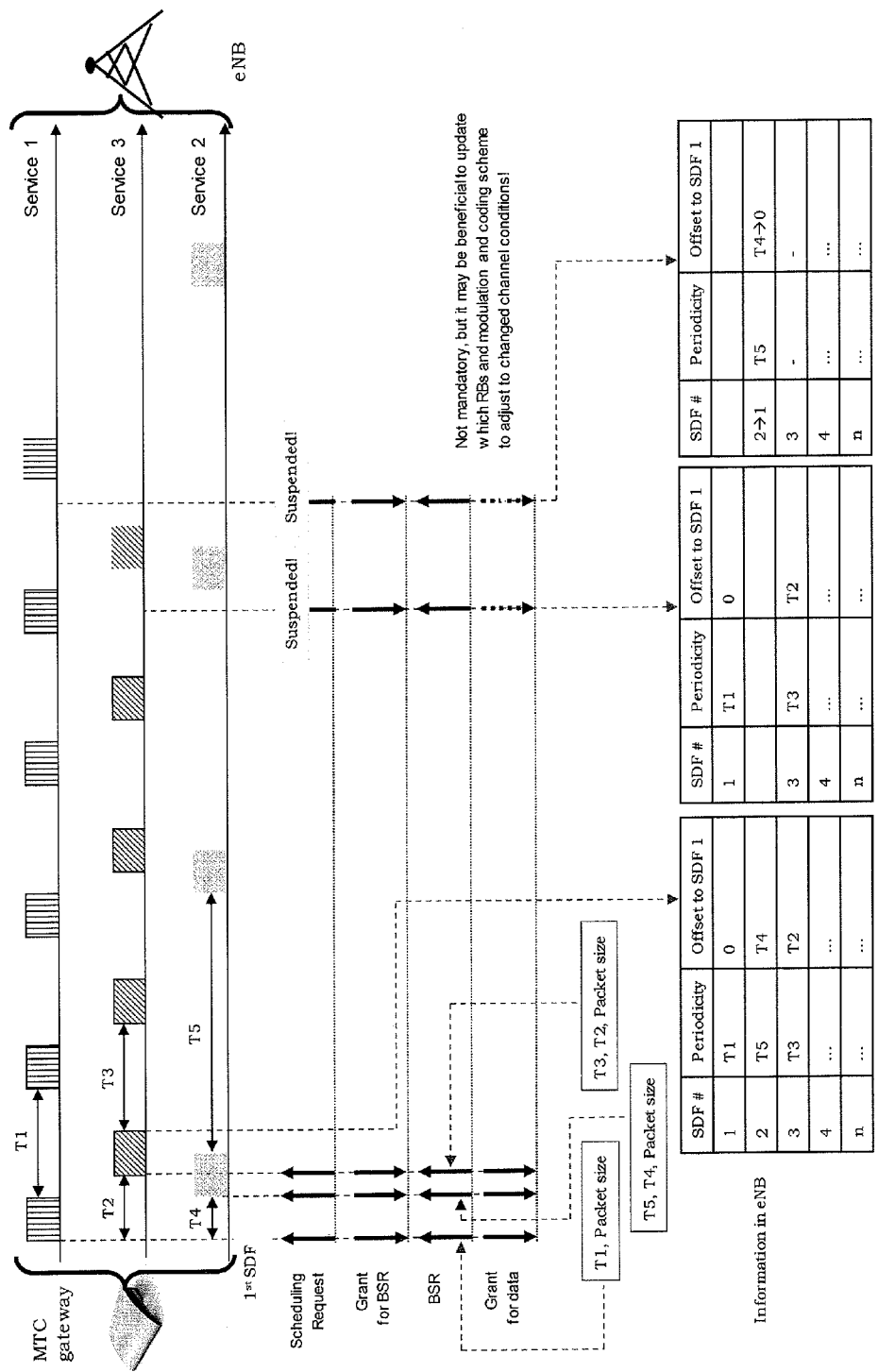
Figure 7:
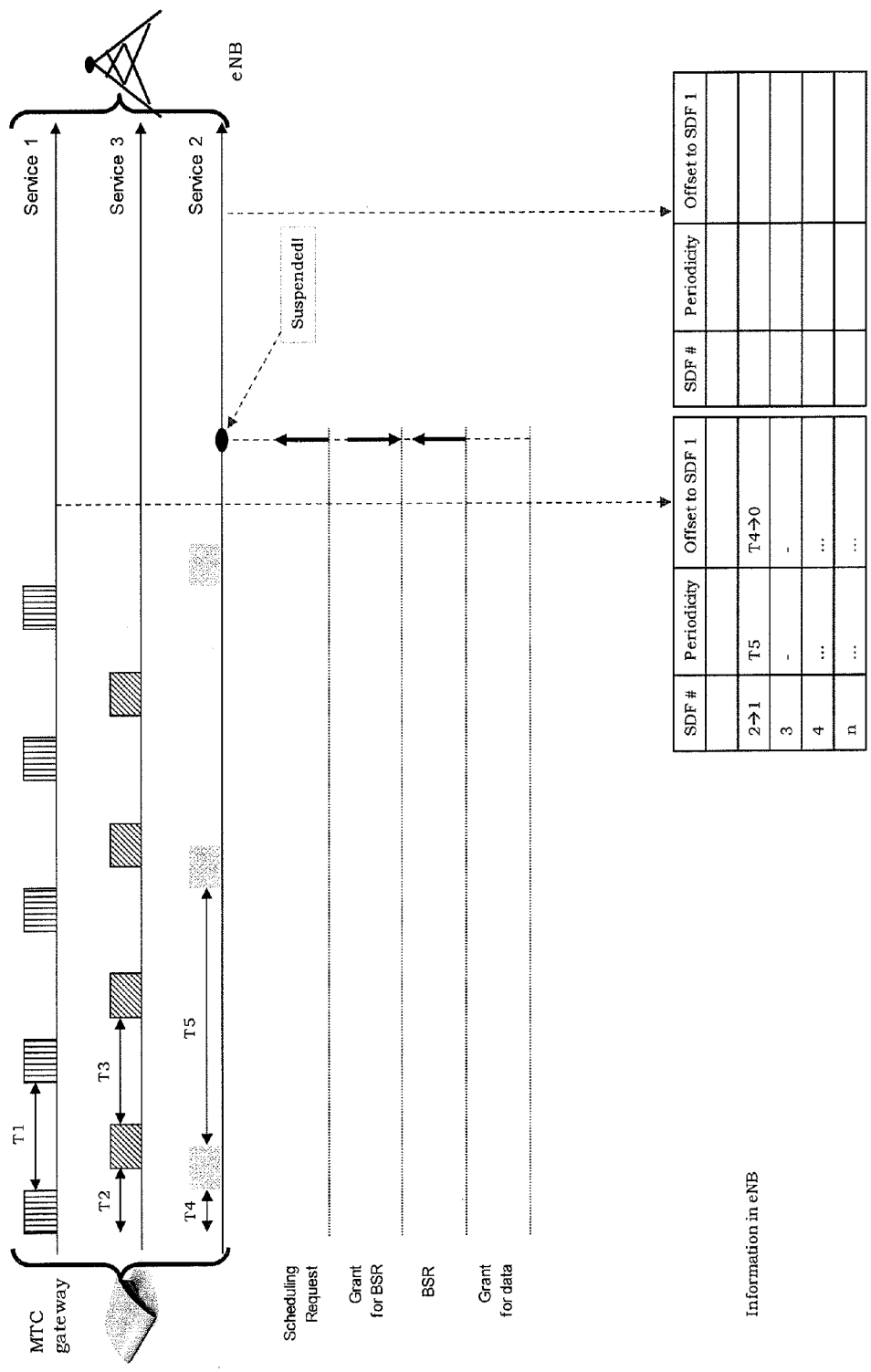
Figure 8:
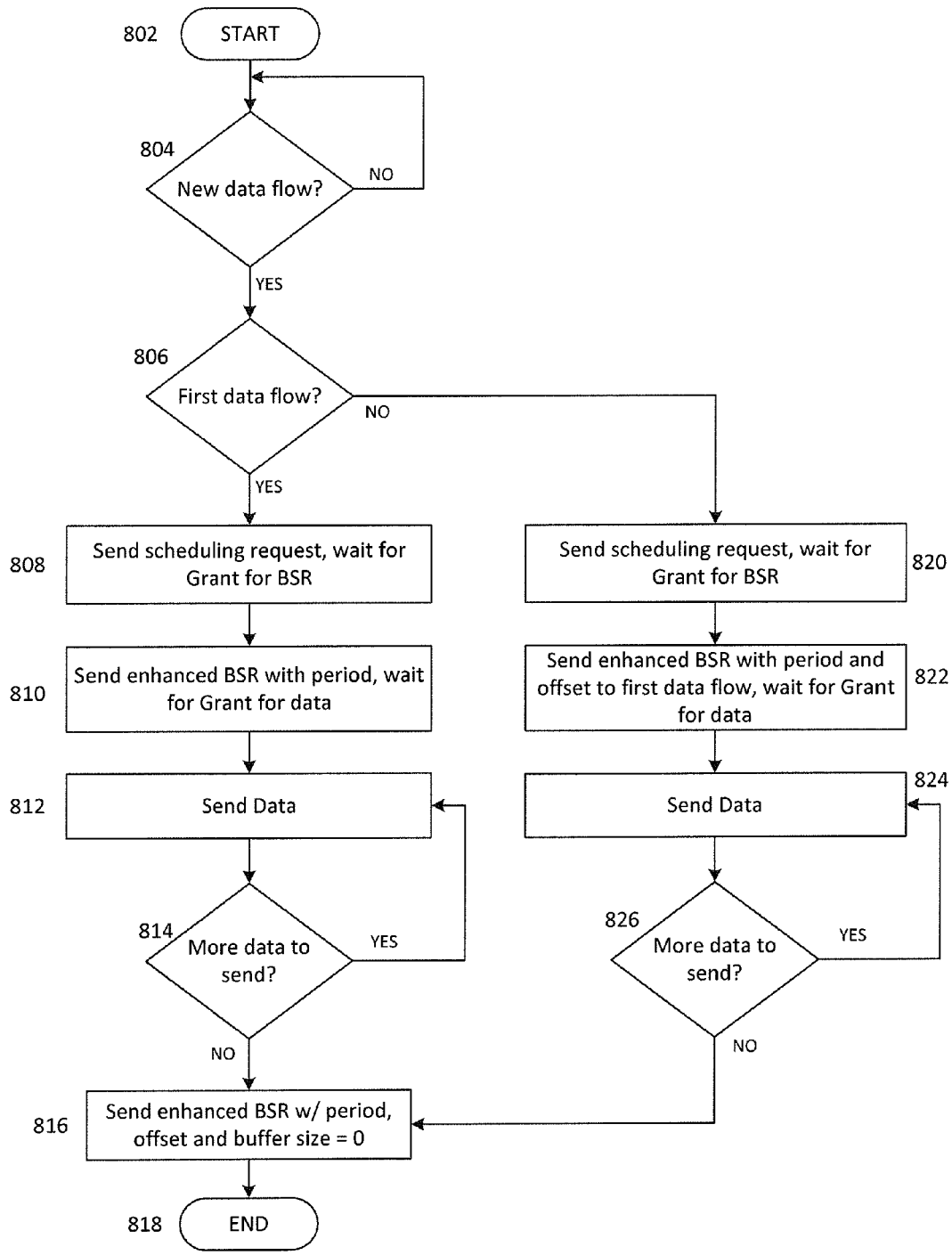
Figure 9:
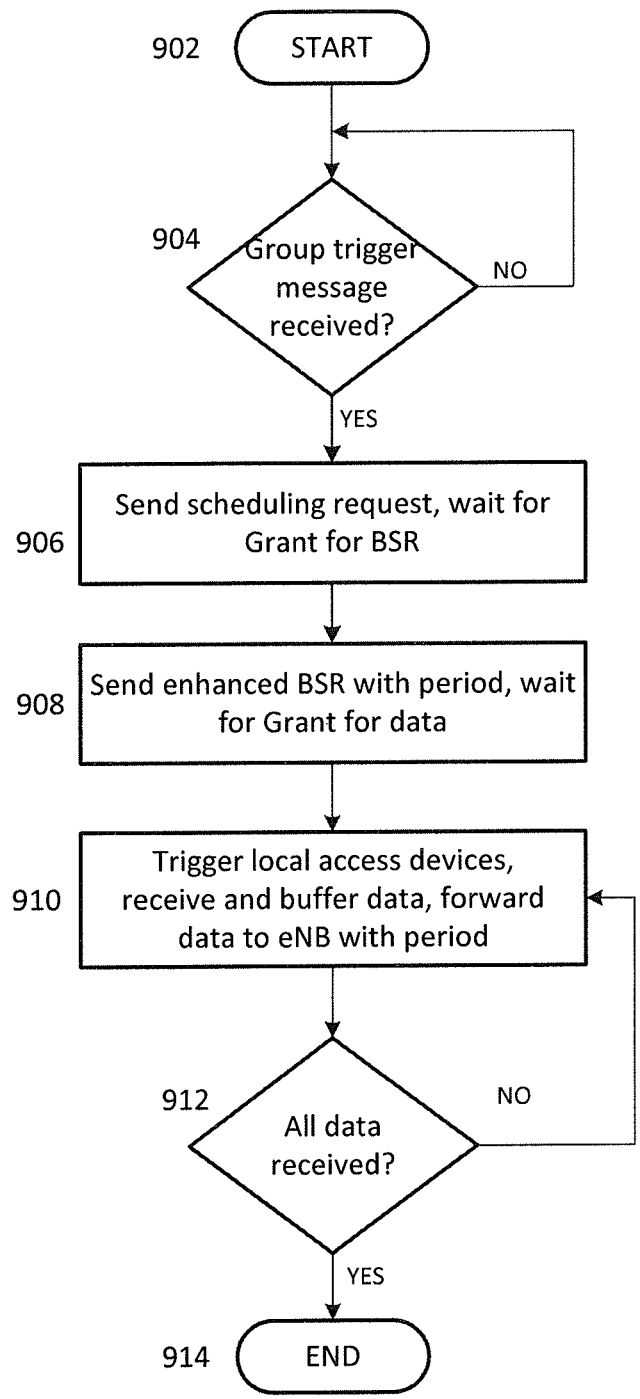
Figure 10:
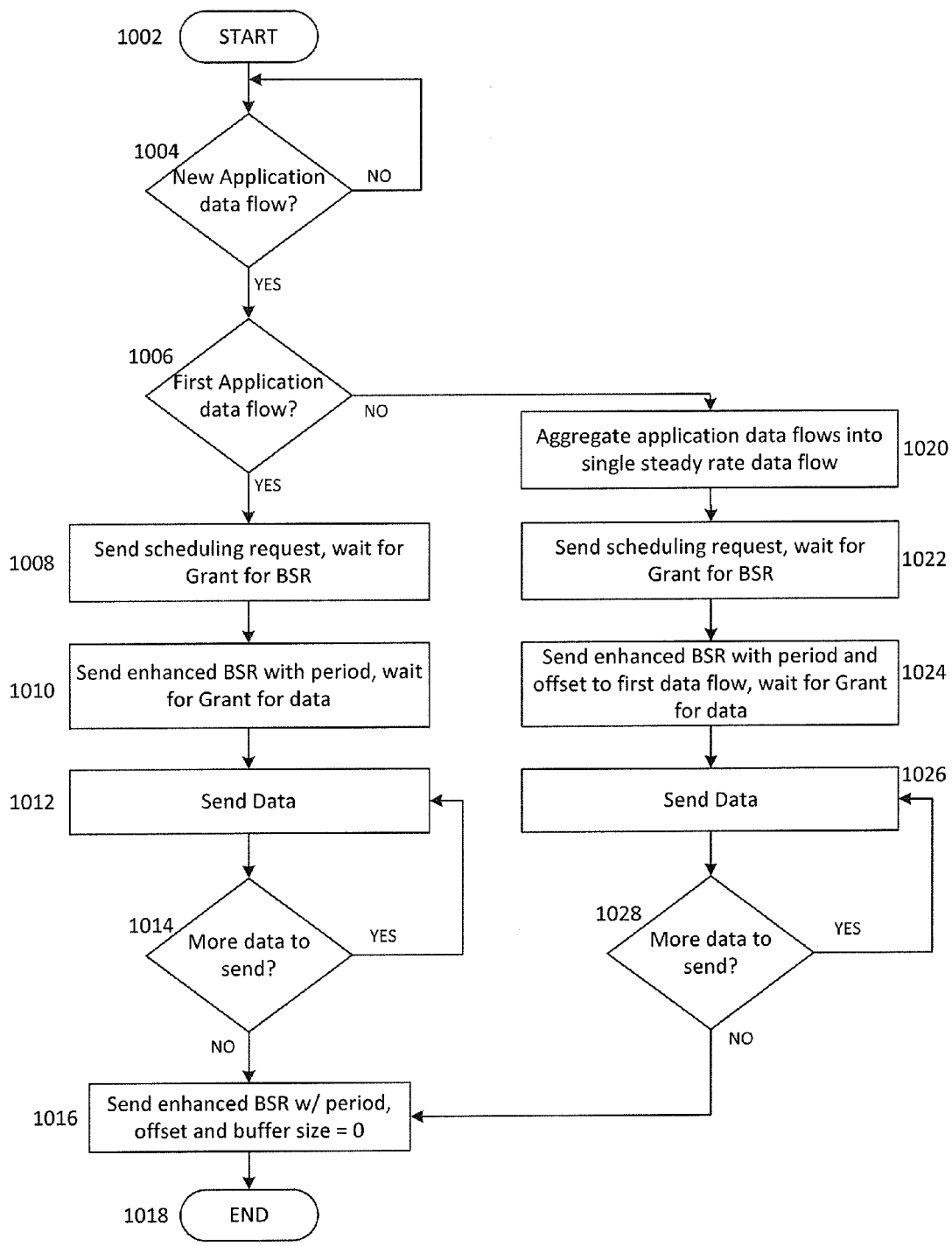
Figure 11:
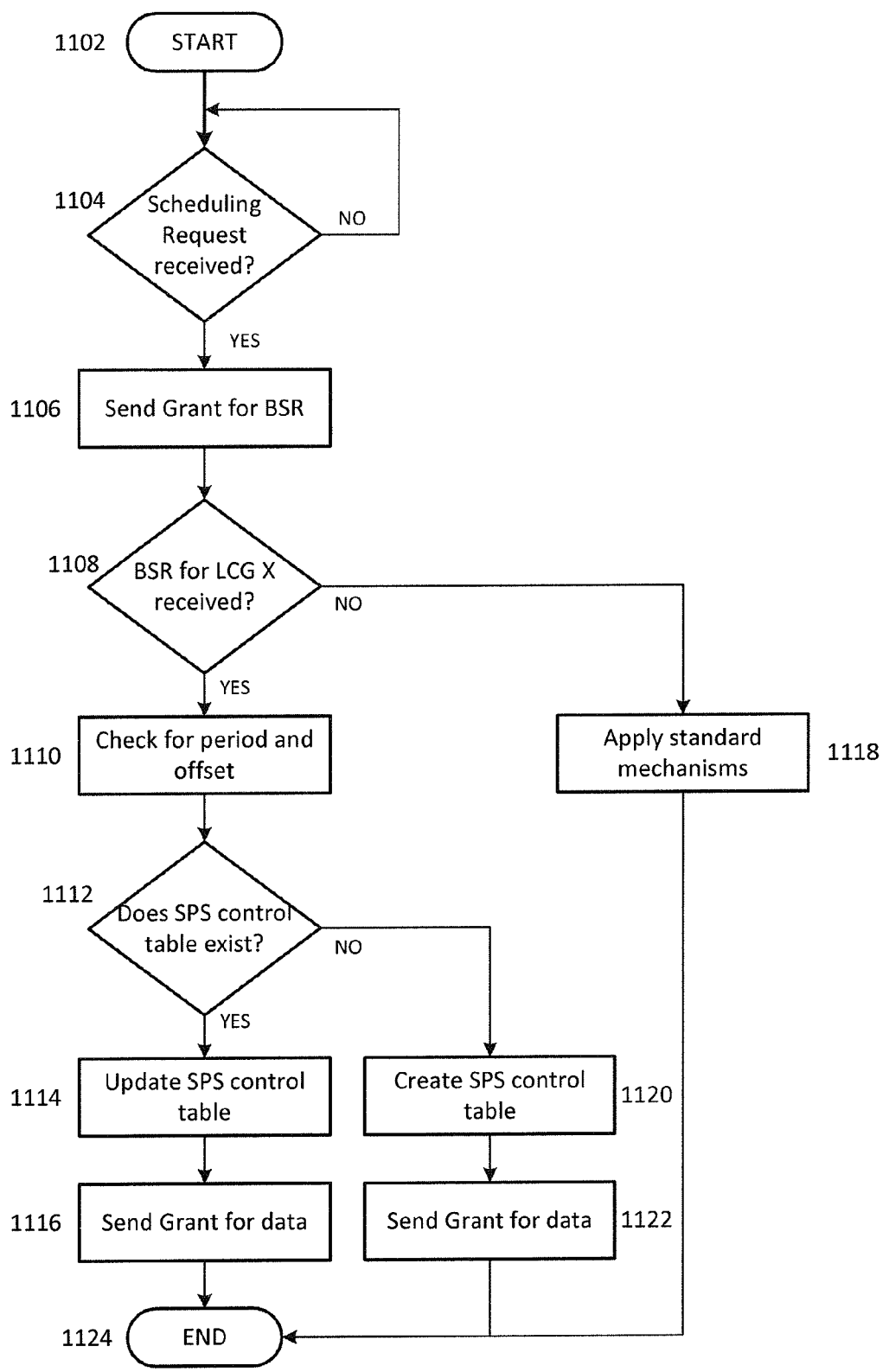
Figure 12:
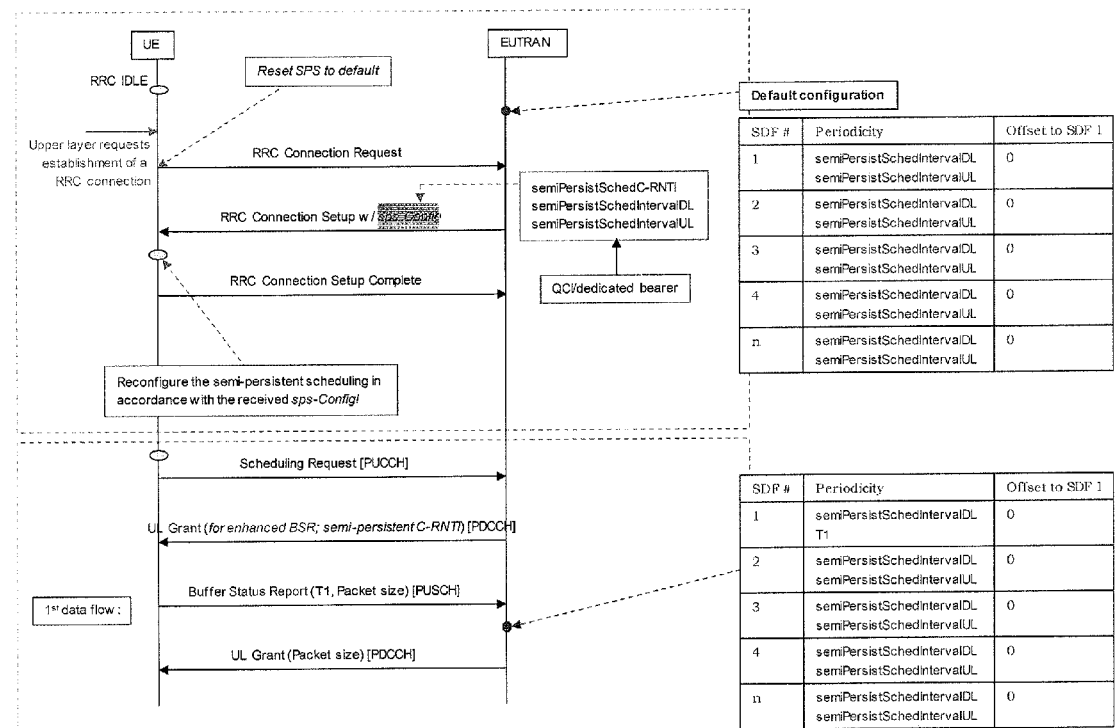
Figure 13:
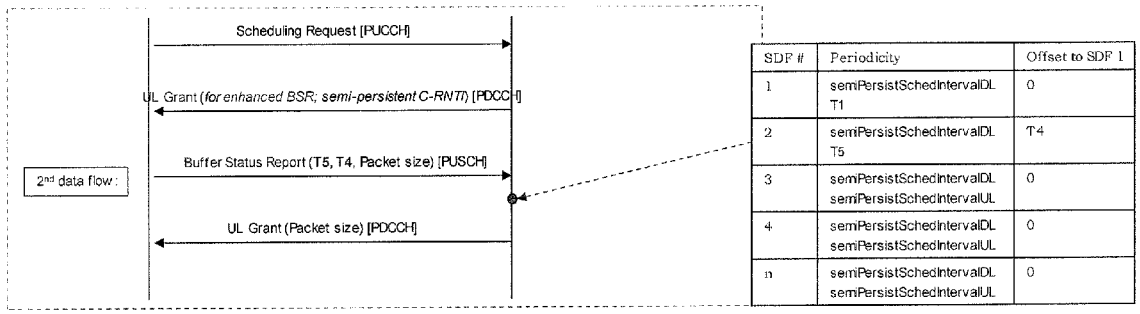
Figure 14:
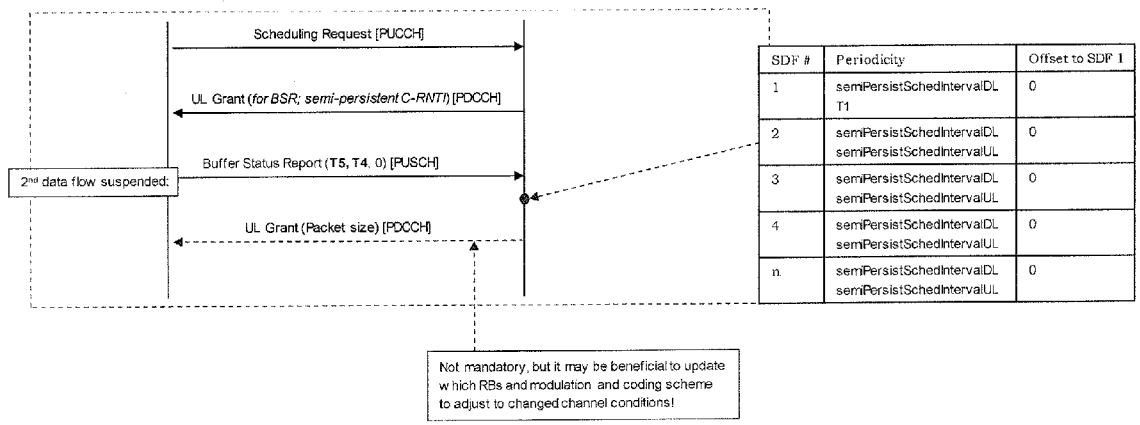
Figure 15:
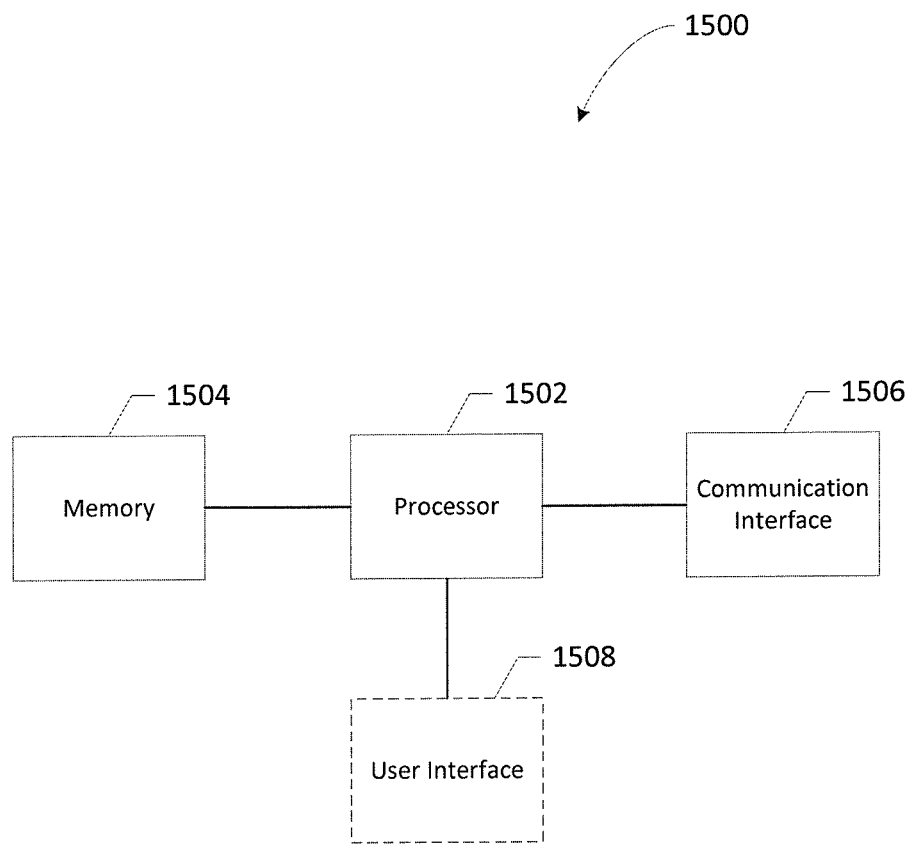

Having thus described certain embodiments of the disclosure in general terms, reference will now be made to the accompanying drawings, which are not necessarily drawn to scale, and wherein:

FIG. 1 illustrates an exemplary MTC device environment where resource allocation may be provided according to some example embodiments of the present disclosure;

FIG. 2 illustrates an exemplary environment using real-time video streaming where resource allocation may be provided according to some example embodiments of the present disclosure;

FIG. 3 illustrates an aggregated data stream and accordingly the persistent resource allocation pattern according to some example embodiments of the present disclosure;

FIG. 4 illustrates an exemplary environment using scheduled time-tolerant data where resource allocation may be provided according to some example embodiments of the present disclosure;

FIG. 5 illustrates an example of user equipment running multiple applications where resource allocation may be provided according to some example embodiments of the present disclosure;

FIGS. 6 and 7 illustrate information sent to the eNodeB within BSR messages according to some example embodiments of the present disclosure;

FIG. 8 is a flowchart of signaling operations within an MTC gateway device according to some example embodiments of the present disclosure;

FIG. 9 is a flowchart of signaling operations within an MTC gateway device according to some example embodiments of the present disclosure;

FIG. 10 is a flowchart of signaling operations within an UE device according to some example embodiments of the present disclosure;

FIG. 11 is a flowchart of signaling operations within an eNodeB according to some example embodiments of the present disclosure;

FIGS. 12-14 illustrate a flow of signaling information according to some example embodiments of the present disclosure; and FIG. 15 illustrates a block diagram of an apparatus that may be configured to perform operations according to some example embodiments of the present disclosure.

DETAILED DESCRIPTION

The present disclosure now will be described more fully hereinafter with reference to the accompanying drawings, in which some, but not all embodiments of the disclosure are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Embodiments of the present disclosure are directed to methods and systems for resource allocation for terminals. Such embodiments may be directed to Machine-Type Communication (MTC), MTC gateway devices, user equipment (UE) terminals running multiple applications, and radio resource scheduling. In some embodiments, resource allocation may be provided for terminals with simultaneous service data flows with small IP packets and periodic properties.

Embodiments of the present disclosure provide for improved resource allocation for terminals, and particularly for terminals with simultaneous service data flows with small IP packets and with periodic properties. Resource allocation in such embodiments may be based on persistent and/or semi-persistent scheduling. In embodiments of the present disclosure, terminals refer to machine-type communication (MTC) gateways serving capillary networks and/or user equipment (UE) terminals running multiple applications. An MTC gateway may also be a regular cellular phone device working as a hub for a number of consumer devices (e.g., wearable computing devices, health-related monitoring devices, etc.) working in proximity to the cellular phone device.

Embodiments of the present disclosure may reduce the L1/L2 signaling load between terminals with simultaneous service data flows with small IP packets and with periodic properties and eNodeB (eNB) and as such may prevent control channel overload and lead to more efficient utilization of the uplink transmission bandwidth.

L1/L2 signaling channels are physical channels without corresponding transport channels, which are used for non-data associated downlink and uplink control information. There are Physical Uplink Control Channels (PUCCH) and Physical Downlink Control Channels (PDCCH). Information on a PUCCH may include a Channel Quality Indication (CQI) report, Scheduling Request (SR), hybrid automatic repeat request (HARQ) ACK/NACK in response to downlink transmission, or the like, for example. Information on a PDCCH may include uplink scheduling grants, information about resource allocation of downlink transport channels, such as the DL-SCH, HARQ information related to the DL-SCH, or the like, for example.

Moreover, semi-persistent scheduling in conjunction with Discontinuous Reception (DRX) may provide considerable power savings for small data transmissions with periodic properties (see, e.g., Michele Polignano et. al, Power Savings and QoS Impact for VoIP Application with DRX/DTX Feature in LTE, IEEE). Power saving mechanisms is a significant issue for MTC applications.

When a non-periodic real-time service with persistent scheduling is scheduled, there may exist resource allocations without packet transmissions, and this is the main resource waste of the persistent scheduling.

The current 3GPP persistent scheduling mechanisms have limitations supporting MTC gateways and UE terminals running multiple applications for several reasons. Persistent scheduling is designed to support one service data flow (e.g., VoIP packets) per data radio bearer (DRB) per terminal. This service data flow has one specific period and one specific starting time. However, a MTC gateway may want to transport traffic of several local access MTC devices simultaneously over one DRB. Similarly, a UE terminal running multiple applications may want to transport traffic of multiple applications simultaneously over one DRB. The different service data flows may have different periods and/or different starting times.

FIG. 1 illustrates an exemplary environment 100 where MTC devices or UE terminals may communicate with one or more servers by connecting through a PLMN and where resource allocation may be provided according to some example embodiments of the present disclosure. Environment 100 includes an MTC capillary network 102 which comprises a plurality of non-3GPP local access MTC devices 106 as well as a plurality of MTC devices with device to device (D2D) capabilities 108. The MTC capillary network 102 provides local connectivity between the local access MTC devices 106 and one or more MTC gateway devices 104. The MTC gateway device 104 provides connectivity for the local access MTC devices 106 to communicate with one or more MTC servers (not shown) through a public land mobile network (PLMN), such as through an eNodeB (eNB) 110. The MTC devices with D2D capabilities 108 may also connect in an MTC capillary network 102 with one or more MTC gateway devices 104 or may directly communicate through the PLMN (eNB 110) with one or more MTC servers.

The environment 100 of FIG. 1 may further comprise a plurality of UE terminals which may be running multiple applications 114 which may be continuously communicating with one or more application servers (not shown) through a PLMN, such as through eNB 110.

FIG. 2 illustrates an exemplary environment using real-time video streaming where resource allocation may be provided according to some example embodiments of the present disclosure. In a typical communication scenario, so called local-access devices without 3GPP communication capability may be located in a MTC capillary network which provides local connectivity between the local-access devices within its coverage and a MTC gateway device. The MTC gateway device is a MTC device which acts as a gateway for local-access devices in a MTC capillary network to communicate through a PLMN with one or more MTC servers.

Several of those local-access devices may run real-time applications, for instance a real-time video streaming application, simultaneously. It can be typically assumed that starting point of the different video streams and periods for such local-access devices are different. FIG. 2 depicts one example of such an embodiment. In an example embodiment, a plurality of local-access devices, such as traffic cameras 206a-206c may communicate with a MTC server through a MTC gateway device 202 and an eNB 204. Such an embodiment may represent a scenario with low device density but with a relatively high amount of payload per device (video stream packets).

In one such example embodiment, a traffic intersection may be observed by eight traffic cameras, such as traffic cameras 206. The traffic cameras of four intersections may communicate with a MTC server (not shown) through the same MTC gateway device, such as MTC gateway 202. So in total 32 cameras may communicate through the same MTC gateway device, for example. The cameras may be switched on and off at different times, for instance when a traffic violation occurs. The packet rate of different cameras may be different, depending for instance on the video resolution. So in total 32 video streams may reach the MTC gateway device which then may aggregate them onto an Evolved Packet System (EPS) bearer for transmission to an eNB, such as eNB 204. For example, each of traffic cameras 206a-206c may transmit a packet video stream which has generally periodic properties, such as video streams 208a-208c, to the MTC gateway 202 which aggregates the streams onto one EPS bearer.

In some embodiments, the eNB, such as eNB 204, learns the pattern of the aggregated stream and may use persistent scheduling to schedule resources according to the pattern. The eNB may further adjust resource scheduling as the pattern changes, such as when streams within the aggregated stream are added or suspended. The eNB may learn the pattern by receiving information about the streams from the terminal, such as MTC gateway 202. For example, the terminal may inform the eNB of the periodicity of packets in each stream as well as offsets from the first stream, such as by using signaling messages. The eNB may then use this information to create and maintain a control table, such as a persistent scheduling/semi-persistent scheduling (PS/SPS) control table, for example as illustrated in FIGS. 6 and 7. In some embodiments, the terminal may provide this information to the eNB in MAC layer signaling. As the eNB learns of changes to the pattern, such as when streams within the aggregated stream are added or suspended, the eNB may update the control table accordingly, such as illustrated in FIG. 7 for example, and modify the required resource allocation. In some embodiments, such pattern determination and resource scheduling may be provided for both the uplink and the downlink communication.

In some embodiments, the eNB may determine whether persistent/semi-persistent scheduling would be beneficial for the data stream. In such embodiments, if the eNB determines persistent/semi-persistent scheduling would be beneficial, the eNB may send a message to the MTC gateway that persistent/semi-persistent scheduling is to be used (e.g., a persistent/semi-persistent scheduled grant for data message). If the eNB determines persistent/semi-persistent scheduling may not be beneficial, the eNB may choose to use dynamic scheduling.

Current persistent/semi-persistent mechanisms support one data flow per data radio bearer (DRB) per terminal. The case where data flows may be dynamically added or removed per DRB as discussed in the above embodiments is not supported by current persistent/semi-persistent scheduling schemes.

FIG. 3 illustrates an aggregated data stream according to some example embodiments of the present disclosure. FIG. 3 depicts an example of an aggregated data stream for three video streams. Local-access devices 306a-c may each transmit an individual video stream 308a-c to an MTC gateway device 302. The MTC gateway device 302 may then aggregate the three video streams into one aggregated data stream 310. This aggregated data stream 310 has a distinctive pattern, as illustrated in pattern 312. In some embodiments, radio resources as well as a fixed modulation and channel-coding scheme are allocated in a persistent fashion according to the distinctive pattern 312 of the aggregated data stream 310. This requires the eNB to "learn" about that pattern in order to persistently allocate resources accordingly and in some embodiments, the eNB may determine whether such a persistent allocation mechanism would be beneficial.

FIG. 4 illustrates an exemplary environment using scheduled time-tolerant data where resource allocation may be provided according to some example embodiments of the present disclosure. In one example embodiment, a number of local-access devices 408 may be triggered to transmit data by the MTC server 406. The trigger message 410 is sent to the MTC gateway device 402 which in turn triggers the local-access devices 408. The MTC gateway 402 may trigger the local-access devices 408 sequentially, such as by first sending trigger message 412a to local-access device 408a, then sending trigger message 412b to local-access device 408b, and so on. All the local-access devices 408 upon receiving the trigger message may send their data to the MTC gateway device 402, such as local-access device 408a sending data 414a, local-access device 408b sending data 414b, and so on. In another example embodiment, the local access devices in the capillary network may be sensor devices (e.g., to measure temperature) reporting a measurement value every 10 minutes, for example, without being explicitly triggered by the MTC gateway. Instead of dynamically scheduling the resources by eNB, the MTC gateway device may send the data packets in a periodic fashion, such as in data stream 416, and the eNB may then persistently schedule the resources. This again requires that the eNB "learns" about the pattern, specifically the periodicity of the data stream and the packet size, such as described in regard to FIG. 3 above. In such embodiments, the MTC gateway may determine a fixed periodicity and a specific packet size for sending the data packets in a periodic fashion. Such an embodiment may represent a scenario with high device density but with a relatively small amount of payload per device.

In some embodiments, the eNB may determine whether persistent/semi-persistent scheduling would be beneficial for the data stream and if the eNB determines persistent/semi-persistent scheduling would be beneficial, the eNB may send a message to the MTC gateway that persistent/semi-persistent scheduling is to be used (e.g., a persistent/semi-persistent scheduled grant for data message). On the other hand, if the eNB determines persistent/semi-persistent scheduling may not be beneficial, the eNB may choose to use dynamic scheduling.

An MTC gateway device generating a data stream with an arbitrary period is currently not possible in persistent/semi-persistent scheduling. In such an embodiment, the MTC gateway device needs to inform the eNB about that arbitrary period for the data stream. Current persistent/semi-persistent scheduling does not provide for terminals to report periodicity to an eNB.

FIG. 5 illustrates an example of user equipment (UE) running multiple applications where resource allocation may be provided according to some example embodiments of the present disclosure. As illustrated in FIG. 5, UE 502 may have a plurality of applications currently running, such as applications 506a-506c, which may need to communicate with an application server (not shown) such as through a mobile network using eNB 512. UE 502 may include a UE function 504 which receives the data streams from the applications, such as data streams 508a-508c, and aggregates the data stream into a single steady rate data stream, such as aggregated steady rate data stream 510. In some embodiments, the eNB 512, "learns" the pattern of the aggregated stream and may use persistent scheduling to schedule resources according to the pattern. The eNB 512 may receive information about the aggregated data stream, such as periodicity of the packets, from the UE 502, such as through UE function 504, and eNB 512 may use this information to "learn" the pattern of the aggregated data stream and schedule necessary resources.

FIGS. 6 and 7 illustrate information sent to the eNB according to some example embodiments of the present disclosure. In some embodiments, the information may be send to the eNB within an enhanced Buffer Status Report (BSR) message.

FIGS. 6 and 7 illustrate three data streams that have been aggregated into a single data stream by an MTC gateway. The MTC gateway may send information regarding the period of a first data stream that is to be aggregated. For example, when the MTC gateway adds a first data stream (Service 1), it may send a signaling message to the eNB indicating the periodicity (T1) for the first data stream and the packet size. When the MTC gateway adds a second data stream (Service 2), it may send a signaling message to the eNB indicating the periodicity (T5) for the second data stream, the offset (T4) from the first data stream, and the packet size. When the MTC gateway adds a third data stream (Service 3), it may send a signaling message to the eNB indicating the periodicity (T3) for the third data stream, the offset (T2) from the first data stream, and the packet size. The eNB may use the received information to create (or update) a PS/SPS control table which the eNB may use for determining how to schedule resources. In some embodiments, the PS/SPS control table may at least contain information regarding the SDF number, the periodicity, and the offset to the first SDF (if not the first SDF) for each data stream to be transported over a radio bearer.

FIG. 6 further illustrates that as the aggregated data stream is changed by adding or suspending a data stream, the MTC gateway may notify the eNB and the eNB may update the PS/SPS control table. For example, if the third data stream (Service 3) is suspended, the information for that data stream may be deleted from the PS/SPS control table. If the first data stream (Service 1) is then suspended, the eNB may update the PS/SPS control table by deleting the information for the first data stream and update the information for the remaining data streams. FIG. 7 illustrates that if the last remaining data stream (Service 2) is suspended, the information may be deleted from the PS/SPS control table. In some embodiments, the control table may be then be deleted. In other embodiments, an empty PS/SPS control table may be maintained.

FIG. 8 illustrates a flow chart of example signaling operations within an MTC gateway device, as illustrated in FIG. 1, which may be used in providing resource scheduling according to some example embodiments of the present disclosure. Operations at the MTC gateway device may begin at block 802.

As shown at block 804, the MTC gateway device may determine if a new data stream with small IP packets and with periodic properties is to be transmitted. In some embodiments, the MTC gateway has the means to determine that a particular data stream comprises small IP packets and has periodic properties. For example, a local access device attaching to a gateway may provide information about the data it usually sends to the MTC gateway. In one example, a video camera may identify itself as a video camera to the MTC gateway so the MTC gateway may conclude that the data stream from that local access device is a video stream that typically has periodic properties. In another example, a local access device, when it establishes a connection to the MTC gateway, may provide an indication that the data stream to be submitted has periodic properties. And in another example, it may also be possible that the MTC gateway has been pre-configured with information that certain local access devices transmit data with periodic properties. If no new data stream is to be transmitted, operation may return to block 802. If the MTC gateway device is to add a new data stream (804, YES), operation continues to block 806. At block 806, the MTC gateway device, may determine if the data stream being added is the first data stream to be transported over the radio bearer.

If the data flow being added is the first data stream, operation may continue to block 808. At block 808, the MTC gateway device may send a scheduling request to the eNB and wait for a Grant for BSR message. Upon receiving the Grant for BSR, the MTC gateway device may send an enhanced BSR to the eNB which includes information on the period of the data stream and the packet size, as shown at block 810. The MTC gateway device may then wait for a Grant for Data message (e.g., a persistent/semi-persistent scheduled Grant for Data message) and, upon receipt, send the data, as shown at block 812.

At block 814, the MTC gateway device may determine if there is more data to send. If so, operation returns to block 812 and continues sending data. If there is no additional data to send, operation may continue to block 816.

At block 816, the MTC gateway device may send an enhanced BSR message to the eNB with the period, offset and buffer size (packet size) set to zero (0). The operation may then continue to block 818 and end.

If, at block 806, the MTC gateway device determines the data stream being added is not the first data stream, operation may continue to block 820. At block 820, the MTC gateway device may send a scheduling request to the eNB and wait for a Grant for BSR message. Upon receiving the Grant for BSR, the MTC gateway device may send an enhanced BSR to the eNB which includes information on the period of the data stream and the offset from the first data stream, as shown at block 822. The MTC gateway device may then wait for a Grant for Data message and, upon receipt, send the data, as shown at block 824.

At block 826, the MTC gateway device may determine if there is more data to send. If so, operation returns to block 824 and continues sending data. If there is no additional data to send, operation may continue to block 816 as described above.

FIG. 9 illustrates a flow chart of example signaling operations within an MTC gateway device that may be used in providing resource scheduling according to some example embodiments of the present disclosure, such as the embodiments illustrated by FIG. 4. Operations at the MTC gateway device may begin at block 902.

As shown at block 904, the MTC gateway device may determine if a group trigger message (e.g., to trigger the sending of data from a plurality of MTC devices, such as trigger message 410 of FIG. 4) has been received, such as from an MTC server or the like and transmitted through an eNB for example. If the MTC gateway device has not received a group trigger message, operation may return to 902 and wait until a group trigger message is received. If the MTC gateway device receives a group trigger message, operation may continue to block 906.

At block 906, the MTC gateway device may send a scheduling request to the eNB and wait for a Grant for BSR message. Upon receiving the Grant for BSR, the MTC gateway device may send an enhanced BSR to the eNB which includes information on the period of the data stream and the packet size, as shown at block 908. The MTC gateway device may then wait for a Grant for Data message, and upon receiving the Grant for Data message, operation may continue to block 910. It may be assumed here that the MTC gateway has some knowledge about the amount of data a local access device is going to transmit and about the number of local access devices it serves. It may get this knowledge through pre-configuration in some embodiments. It may also learn about the amount of data per local access device and the total number of local access devices by observing the data transmissions from the local access devices. For instance, the local access devices may be temperature sensors that send measurement values of 100 bytes every 10 minutes and 1,000 sensors are deployed in the capillary network served by the MTC gateway. Based on this information the MTC gateway may calculate the optimal packet size and the period of the data stream towards the eNB.

At block 910, the MTC gateway device may trigger the local-access MTC devices within the group, such as by sending sequential trigger messages to each local-access MTC device. The MTC gateway device may receive and buffer the data from a plurality of the MTC devices. The MTC gateway device may generate a data stream comprising the buffered data using the period that was transmitted to the eNB at block 908. The MTC gateway device may then transmit the data stream to the eNB, where the data stream has the defined period.

At 912, the MTC gateway device may determine if there is more data received from the local access devices. If more data is received, the MTC gateway device may then return to block 910 to buffer and transmit the data to the eNB with the defined period. If there is no more data to be received, operation continues to block 914 and end.

FIG. 10 illustrates a flow chart of example signaling operations within a UE device, as illustrated in FIG. 5, which may be used in providing resource scheduling according to some example embodiments of the present disclosure. Operations at the UE device, such as UE 502, may begin at block 1002.

As shown at block 1004, the UE device may determine if a new application data stream is to be transmitted. If no new application data stream is to be transmitted, operation may return to block 1002. If the UE device is to add a new application data stream (1004, YES), operation continues to block 1006. At block 1006, the UE device may determine if the application data stream being added is the first data stream to be transported over the radio bearer.

If the application data flow being added is the first data stream, operation may continue to block 1008. At block 1008, the UE device may send a scheduling request to the eNB and wait for a Grant for BSR message. Upon receiving the Grant for BSR, the UE device may send an enhanced BSR to the eNB which includes information on the period of the data stream and the packet size, as shown at block 1010. The UE device may then wait for a Grant for Data message and, upon receipt, send the data, as shown at block 1012.

At block 1014, the UE device may determine if there is more data to send. If so, operation returns to block 1012 and continues sending data. If there is no additional data to send, operation may continue to block 1016.

At block 1016, the UE device may send an enhanced BSR message to the eNB with the period, offset and buffer size (packet size) set to zero (0). The operation may then continue to block 1018 and end.

If, at block 1006, the UE device determines the application data stream being added is not the first data stream, operation may continue to block 1020. At block 1020, the UE device may aggregate the existing data flow and the new application data flow into a single steady rate data flow. At block 1022, the UE device may send a scheduling request to the eNB and wait for a Grant for BSR message. Upon receiving the Grant for BSR, the UE device may send an enhanced BSR to the eNB which includes information on the period of the data stream and the offset from the first data stream, as shown at block 1024. In some embodiments, such as where a new aggregated data flow is relatively simple, the UE may instead send a request to the eNB with a new periodicity to replace the original request. The UE device may then wait for a Grant for Data message and, upon receipt, send the data, as shown at block 1026

At block 1028, the UE device may determine if there is more data to send. If so, operation returns to block 1026 and continues sending data. If there is no additional data to send, operation may continue to block 1016 as described above.

FIG. 11 illustrates a flow chart of example signaling operations within an eNB according to some example embodiments of the present disclosure. Operations at the eNB may begin at block 1102.

As shown at block 1104, the eNB may determine if a scheduling request has been received, such as from an MTC gateway device or a UE. If the eNB has not received a scheduling request, operation may return to 1102. If the eNB receives a scheduling request, operation may continue to 1106. At block 1106, after the eNB has received a scheduling request, the eNB may send a Grant for BSR to the terminal originating the request, such as a MTC gateway or UE.

At block 1108, the eNB may determine if a BSR for Logical Channel Group (LCG) X (where X is a specific LCG). If the eNB does not receive a BSR for LCG X, operation continues to block 1118 where standard transmission mechanisms are applied, Operation may then continue to block 1124 where operation ends. If the eNB does receive a BSR for LCG X, operation continues to block 1110. For example, in some embodiments, if the eNB does not receive a BSR for LCG X, the eNB may determine that persistent/semi-persistent scheduling is not beneficial and may determine that dynamic scheduling should be used for transmissions.

At block 1110, the eNB checks the BSR for a period or a period and offset. At block 1012, the eNB may determine whether a PS/SPS control table already exists. If there is no existing PS/SPS control table, the eNB continues to block 1120 where the PS/SPS control table is created, with the period or period and offset received in the BSR. At block 1122, the eNB may then schedule resources based on the PS/SPS control table and then send a Grant for data to the terminal. Operation may then continue to block 1124 and end.

If, at block 1112, the eNB determines that a PS/SPS control table already exists, operation may continue to block 1114. At block 1114, the eNB may use the received period and offset to update the PS/SPS control table. At block 1116, the eNB may then schedule resources based on the PS/SPS control table and then send a Grant for data to the terminal. Operation may then continue to block 1124 and end.

FIGS. 12-14 illustrate a flow of signaling information according to some example embodiments of the present disclosure. FIG. 12 illustrates signaling to establish a connection between a terminal (e.g., a UE or MTC gateway device) and the network (e.g., an eNB in a EUTRAN) and the establishment of a first data stream on the radio bearer. The terminal sends a Radio Resource Control (RRC) Connection Request message to the eNB and receives a RRC Connection Setup message with sps-Config data from the eNB. The terminal may then reconfigure semi-persistent scheduling based on the received sps-Config data and send a RRC Connection Setup Complete message to the eNB.

The terminal may then setup a first data stream (e.g., an uplink data stream) on a radio bearer by sending a scheduling request message to the eNB. The terminal may then receive a UL Grant for BSR message from the eNB. The terminal may then send a BSR message to the eNB indicating the period for the first data stream (T1) and the packet size. The eNB may then create or update a SPS control table and set the periodicity value for the first data stream (SDF#1) for uplink to T1 and may schedule resources based on the SPS control table. The eNB may set the offset value for the first stream in the SPS control table to zero (0) since it is the first stream on the radio bearer. The eNB may then send a UL Grant for data message to the terminal and the terminal may begin sending data.

FIG. 13 illustrates the terminal establishing a second data stream on the radio bearer and the eNB updating the SPS control table with the period and offset for the second data stream. To establish the second data stream, the terminal may send a scheduling request message to the eNB. The terminal may then receive a UL Grant for BSR message from the eNB. The terminal may then send a BSR message to the eNB indicating the period for the second data stream (T5), the offset to the first data stream (T4), and the packet size. The eNB may then update the SPS control table and set the periodicity value for the second data stream (SDF#2) for uplink to T5 and set the offset value to T4. The eNB may schedule resources based on the updated SPS control table. The eNB may then send a UL Grant for data message to the terminal and the terminal may begin sending data for the second data flow.

FIG. 14 illustrates the terminal suspending a second data stream on the radio bearer and the eNB updating the SPS control table based on suspending the data stream. To suspend the second data stream, the terminal may send a BSR message to the eNB indicating the period for the second data stream (T5), the offset to the first data stream (T4), and a packet size of zero (0). The eNB may then update the SPS control table to clear the periodicity value and the offset value for the second data stream (SDF#2). The eNB may then adjust scheduled resources based on the updated SPS control table. In some embodiments, the eNB may optionally send a UL Grant for data message to the terminal to indicate changed channel conditions.

FIG. 15 illustrates a block diagram of an apparatus that may be configured to perform operations according to some example embodiments of the present disclosure. In example embodiments, an apparatus of FIG. 15 may be configured to perform one or more of the operations as set forth by FIGS. 1 through 11 above.

As shown in FIG. 15, an apparatus 1500 in accordance with one example embodiment may include or otherwise be in communication with one or more of a processor 1502, a memory 1504, a communication interface 1506, and, optionally, a user interface 1508.

The processor 1502 may be embodied in a number of different ways. For example, the processor may be embodied as one or more of various hardware processing means such as a coprocessor, a microprocessor, a controller, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In some embodiments, the processor (and/or co-processors or any other processing circuitry assisting or otherwise associated with the processor) may be in communication with the memory 1504 via a bus for passing information among components of the apparatus. The memory device 1504 may include, for example, a non-transitory memory, such as one or more volatile and/or non-volatile memories. In other words, for example, the memory 1404 may be an electronic storage device (e.g., a computer readable storage medium) comprising gates configured to store data (e.g., bits) that may be retrievable by a machine (e.g., a computing device like the processor). The memory 1504 may be configured to store information, data, content, applications, instructions, or the like for enabling the apparatus to carry out various functions in accordance with an example embodiment of the present disclosure. For example, the memory 1504 could be configured to buffer input data for processing by the processor 1502. Additionally or alternatively, the memory 1504 could be configured to store instructions for execution by the processor.

In some embodiments, the communication interface 1506 may be any means such as a device or circuitry embodied in either hardware or a combination of hardware and software that is configured to receive and/or transmit data from/to a network and/or any other device or module in communication with the apparatus 1500.

Optionally, in some embodiments, the apparatus 1500 may include a user interface 1508 that may, in turn, be in communication with the processor 1502 to provide output to a user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms.

As described above, FIGS. 8 through 11 illustrate flowcharts of operations according to example embodiments of the disclosure. It will be understood that each block of the flowchart, and combinations of blocks in the flowchart, may be implemented by various means, such as hardware, firmware, processor, circuitry, and/or other devices associated with execution of software including one or more computer program instructions.

Accordingly, blocks of the flowchart support combinations of means for performing the specified functions and combinations of operations for performing the specified. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:
1. A method comprising:
 determining, by a terminal, a data stream is to be transported over a radio bearer in an aggregated data stream;
 determining if the data stream is a first data stream to be transported over the radio bearer;

in an instance where the data stream is the first data stream, sending a signaling message at least comprising a periodicity of the first data stream and a packet size to a network node;

in an instance where the data stream is an additional data stream to be transported over the radio bearer, sending the signaling message at least comprising a periodicity of the additional data stream, an offset from the first data stream, and a packet size to the network node;

receiving a persistent/semi-persistent scheduled grant for data message from the network node if the network node determines that persistent/semi-persistent scheduling is beneficial, otherwise the network node may choose dynamic scheduling, wherein the network node determines that persistent/semi-persistent scheduling is beneficial based at least in part on a control channel load associated with the data stream being determined to exceed a predetermined threshold; and sending the aggregated data stream to the network node.

2. The method of claim 1 further comprising:
determining, by the terminal, one of one or more data streams is to be suspended; and
sending a signaling message at least comprising a periodicity of the data stream to be suspended, an offset from the first data stream, and a packet size to the network node, wherein the packet size is set to zero.

3. The method of claim 1 wherein the terminal is a machine type communication gateway device.

4. The method of claim 3 wherein the data stream is transmitted to the machine type communication gateway device from a local-access machine type communication device.

5. An apparatus comprising:
at least one processor, and
at least one memory including computer program instructions, the memory and computer program instructions being configured to, in cooperation with the processor, cause the apparatus to:
determine a data stream is to be transported over a radio bearer in an aggregated data stream;
determine if the data stream is a first data stream to be transported over the radio bearer;
in an instance where the data stream is the first data stream, send a signaling message at least comprising a periodicity of the first data stream and a packet size to a network node;
in an instance where the data stream is an additional data stream to be transported t over the radio bearer, send the signaling message at least comprising a periodicity of the additional data stream, an offset from the first data stream, and a packet size to the network node;
receive a persistent/semi-persistent scheduled grant for data message from the network node if the network node determined that persistent/semi-persistent scheduling is beneficial, otherwise the network node may chose dynamic scheduling, wherein the network node determines that persistent/semi-persistent scheduling is beneficial based at least in part on a control channel load associated with the data stream being determined to exceed a predetermined threshold; and
send the aggregated data stream to the network node.

6. The apparatus of claim 5 further comprising the memory and computer program instructions being configured to, in cooperation with the processor, cause the apparatus to:
determine one of one or more data streams is to be suspended; and
send a signaling message at least comprising a periodicity of the data stream to be suspended, an offset from the first data stream, and a packet size to the network node, wherein the packet size is set to zero.

7. The apparatus of claim 5 wherein the data stream is transmitted to the apparatus from a local-access machine type communication device.

8. A method comprising:
receiving data from a terminal comprising one of: a periodicity of a first data stream or a periodicity of an additional data stream and an offset from the first data stream;
determining if a persistent/semi-persistent scheduling control table exists for the data stream;
in an instance where the persistent/semi-persistent scheduling control table does not already exist, creating the persistent/semi-persistent scheduling control table based at least on the data from the terminal;
in an instance where the persistent/semi-persistent scheduling control table already exists, modifying the persistent/semi-persistent scheduling control table based at least on the data from the terminal;
determining scheduling based at least in part upon the persistent/semi-persistent scheduling control table; and
sending a persistent/semi-persistent grant for data message to the terminal if it is determined that persistent/semi-persistent scheduling is beneficial, otherwise choosing dynamic scheduling, wherein persistent/semi-persistent scheduling is determined to be beneficial based at least in paint on a control channel load associated with the data stream being determined to exceed a predetermined threshold.

9. An apparatus comprising:
at least one processor, and
at least one memory including computer program instructions, the memory and computer program instructions being configured to, in cooperation with the processor, cause the apparatus to:
receive data from a terminal comprising one of a periodicity of a first data stream or a periodicity of an additional data stream and an offset from the first data stream;
determine if a persistent/semi-persistent scheduling control table exists for the data stream;
in an instance where the persistent/semi-persistent scheduling control table does not already exist, create the persistent/semi-persistent scheduling control table based at least on the data from the terminal;
in an instance where the persistent/semi-persistent scheduling control table already exists, modify the persistent/semi-persistent scheduling control table based at least on the data from the terminal;
determine scheduling based at least in part upon the persistent/semi-persistent scheduling control table; and
send a persistent/semi-persistent grant for data message to the terminal if the apparatus determines that persistent/semi-persistent scheduling is beneficial, otherwise the apparatus may choose dynamic scheduling, wherein the apparatus is further configured to determine persistent/semi-persistent scheduling to be beneficial based at least in part on a control channel load associated with the data stream being determined to exceed a predetermined threshold.

10. A method comprising:
receiving, by a terminal, data from one or more local-access devices;

determining a fixed periodicity and a specific packet size for sending the data in an aggregated data stream to a network node;

sending a signaling message at least comprising the fixed periodicity of the aggregated data stream and the specific packet size to the network node;

receiving a persistent/semi-persistent grant for data message from the network node if the network node determines that persistent/semi-persistent scheduling is beneficial, otherwise the network node may choose dynamic scheduling, wherein the network node determines that persistent/semi-persistent scheduling is beneficial based at least in part on a control channel load associated with the single data stream being determined to exceed a predetermined threshold; and sending the aggregated data stream with the fixed periodicity and the specific packet size to the network node if the network node has chosen persistent/semi-persistent scheduling.

11. The method of claim 10 wherein the terminal is a machine type communication gateway device.

12. An apparatus comprising:
at least one processor, and
at least one memory including computer program instructions, the memory and computer program instructions being configured to, in cooperation with the processor, cause the apparatus to:
receive data from one or more local-access devices;
determine a fixed periodicity and a specific packet size for sending the data in an aggregated data stream to a network node;
send a signaling message at least comprising the fixed periodicity of the aggregated data stream and the specific packet size to the network node;
receive a persistent/semi-persistent grant for data message from the network node if the network node determines that persistent/semi-persistent scheduling is beneficial, otherwise the network node may choose dynamic scheduling, wherein the network node determines that persistent/semi-persistent scheduling is beneficial based at least in part on a control channel load associated with the single data stream being determined to exceed a predetermined threshold; and
send the aggregated data stream with the fixed periodicity and the specific packet size to the network node if the network node has chosen persistent/semi-persistent scheduling.

13. A method comprising:
identifying data streams from one or more applications running on a device;
determining a fixed periodicity for sending the data comprising the data streams from the one or more applications as a single data stream;
sending a signaling message at least comprising the fixed periodicity of the single data stream and a packet size to a network node;
receiving a persistent/semi-persistent grant for data message from the network node if the network node determines that persistent/semi-persistent scheduling is beneficial, otherwise the network node may choose dynamic scheduling, wherein the network node determines that persistent/semi-persistent scheduling is beneficial based at least in part on a control channel load associated with the single data stream being-determined to exceed a predetermined threshold; and sending the single data stream with the fixed periodicity and the packet size to the network node if the network node has chosen persistent/semi-persistent scheduling.

14. An apparatus comprising:
at least one processor, and
at least one memory including computer program instructions, the memory and computer program instructions being configured to, in cooperation with the processor, cause the apparatus to:
identify data streams from one or more applications running on a device;
determine a fixed periodicity for sending the data comprising the data streams from the one or more applications as a single data stream;
send a signaling message at least comprising the fixed periodicity of the single data stream and a packet size to a network node;
receive a persistent/semi-persistent grant for data message from the network node if the network node determines that persistent/semi-persistent scheduling is beneficial, otherwise the network node may choose dynamic scheduling, wherein the network node determines that persistent/semi-persistent scheduling is beneficial based at least in part on a control channel load associated with the single data stream being determined to exceed a predetermined threshold; and
send the single data stream with the fixed periodicity and the packet size to the network node if the network node has chosen persistent/semi-persistent scheduling.

15. A system comprising:
a terminal; and
a network node;
the terminal comprising:
at least one processor, and
at least one memory including computer program instructions, the memory and computer program instructions being configured to, in cooperation with the processor, cause the terminal to:
determine a data stream is to be transported over a radio bearer in an aggregated data stream;
determine if the data stream is a first data stream to be transported over the radio bearer;
in an instance where the data stream is the first data stream, send a signaling message at least comprising a periodicity of the first data stream and a packet size to the network node;
in an instance where the data stream is an additional data stream to be transported over the radio bearer, send the signaling message at least comprising a periodicity of the additional data stream, an offset from the first data stream, and a packet size to the network node;
receive a persistent/semi-persistent grant for data message from the network node if the network node determines that persistent/semi-persistent scheduling is beneficial, otherwise the network node may choose dynamic scheduling; and
send the aggregated data stream to the network node; and
the network node comprising:
at least one processor, and
at least one memory including computer program instructions, the memory and computer program instructions being configured to, in cooperation with the processor, cause the network node to:

receive data from the terminal comprising one of: a periodicity of a first data stream or a periodicity of an additional data stream and an offset from the first data stream;

determine if a persistent/semi-persistent scheduling control table exists for the data stream;

in the instance where the persistent/semi-persistent scheduling control table does not already exist, create the persistent/semi-persistent scheduling control table based at least on the data from the terminal;

in the instance where the persistent/semi-persistent scheduling control table already exists, modify the persistent/semi-persistent scheduling control table based at least on the data from the terminal;

determine scheduling based at least in part upon the persistent/semi-persistent scheduling control table; and send a persistent/semi-persistent grant for data message to the terminal if the network node determined that persistent/semi-persistent scheduling is beneficial, otherwise the network node may chose dynamic scheduling, wherein the network node determines that persistent/semi-persistent scheduling is beneficial based at least in part on a control channel load associated with the data stream being determined to exceed a predetermined threshold.

16. The system of claim 15 wherein the terminal further comprises the memory and computer program instructions being configured to, in cooperation with the processor, cause the terminal to:

determine one of one or more data streams is to be suspended; and send a signaling message at least comprising the periodicity of the data stream to be suspended, an offset from the first data stream, and a packet size to the network node, wherein the packet size is set to zero.

* * * * *